Patented Feb. 10, 1953

2,628,229

UNITED STATES PATENT OFFICE 2,628,229

PYRIMIDINE DERIVATIVES

William Robert Boon and Thomas Leigh, Blackley, Manchester, England, assignors to Imperial Chemical Industries Limited, a corporation of Great Britain No Drawing. Application August 7, 1950, Serial No. 178,181. In Great Britain August 19, 1949

7 Claims. (Cl. 260—154)

This invention relates in the first place to new pyrimidine derivatives and to a process for making them.

The new pyrimidine derivatives of this invention are compounds of the general formula:

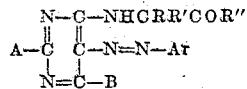

wherein A stands for hydroxyl, amino, alkylamino or thiol groups, wherein B stands for hydroxyl, alkoxy, thiol, alkylthio, amino or mono- or di-substituted amino groups, wherein Ar is an aryl radical which optionally may bear substituents, wherein R and R' may be hydrogen, hydrocarbon, or substituted hydrocarbon radicals and one of them, but not both at once, may be the group —COR'', and wherein R'' is hydrogen, a hydrocarbon radical or a hydrocarbon-oxy radical, or an amino or mono-substituted-amino group.

The said new pyrimidine derivatives are useful as intermediates in the manufacture of substances of chemotherapeutic value, for example of folic acid and related compounds.

They may be manufactured, and it is a further feature of the invention so to manufacture them, by a process which comprises reacting a pyrimidine derivative of the formula:

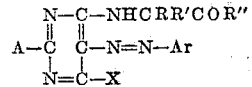

wherein A, Ar, R, R' and R'' have the meaning stated above and X stands for a halogen atom, with reagents adapted to the replacement of an active halogen substituent, by hydroxyl, alkoxy, thiol, alkylthio, amino or mono- or di-substituted amino groups.

Such reagents are for example alkali metal hydroxides; alkali metal alkoxides; hydrogen sulphide or alkali metal hydrosulphides, alkali metal mercaptides; ammonia or primary or secondary amines.

In the case of those new compounds of the invention represented by the above formula wherein B is a hydroxy, thiol, amino or alkylamino group they may also be made by a process which comprises reacting a pyrimidine derivative of the formula:

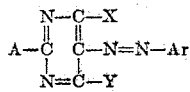

wherein A and Ar have the meaning stated above, wherein Y is a hydroxyl, thiol, amino or monosubstituted amino group, and wherein X stands for a halogen atom, with an α-amino-aldehyde, -ketone or -carboxylic acid ester or amide of the formula: NH₂—CRR'—COR'' wherein R, R' and R'' have the significance stated above.

Where R'' is hydrogen or hydrocarbon, i. e. where the starting material is an amino-aldehyde or -ketone, this may be used in the form of a functional derivative thereof, for example of an acetal, oxime or semi-carbazone thereof, the product being then subsequently liberated from e. g. its acetal, oxime or semicarbazone by hydrolysis.

By yet a further feature of the invention we provide a process for the manufacture of derivatives of pteridin which comprises reacting upon the aforesaid pyrimidine derivatives of the formula:

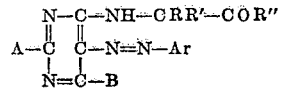

by means of reducing agents so that the —N=N—Ar group is converted to an —NH₂ group, the so-formed amino-compound being then either permitted spontaneously, or constrained, for example, by heat, to undergo ring closure with formation of, where R'' is hydrogen or hydrocarbon, pteridin derivatives of the formula:

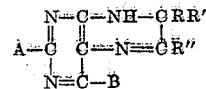

or, where R'' is a hydrocarbon-oxy, amino or mono-substitued amino group, pteridin derivatives of the formula:

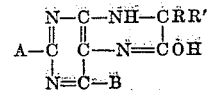

with elimination, as will be understood, in the first case of water and in the second case of the alcohol R''H, ammonia or a primary amine.

The said pteridin derivatives, which are dihydropteridins, may, when at least one of R and R' is hydrogen, as is known, be converted to the corresponding pteridin by oxidation.

The invention is illustrated but not limited by the following examples in which the parts are by weight.

Example 1

12 parts of 2-amino-4-methoxy-6-chloropyrimidine are dissolved in 50 parts of cold concentrated hydrochloric acid and the solution is heated on the steam-bath during 30 minutes. The mixture is then cooled, diluted with 200 parts of water and filtered. The solid residue consists of 2-amino-4-hydroxy-6-chloropyrimidine, M. P. 261° C., which has the formula:

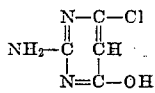

87 parts of 2-amino-4-hydroxy-6-chloropyrimidine, made as described above, are dissolved in 3600 parts of 0.2 N sodium hydroxide and 120 parts of sodium carbonate are added to the solution. A solution of benzenediazonium chloride prepared from 56 parts of aniline is added to the stirred solution during one hour. The mixture is stirred for a further 12 hours and is then filtered and the solid residue is washed successively with water, alcohol and ether. It consists of 2-amino-4-hydroxy-5-benzeneazo-6-chloropyrimidine, which has the formula:

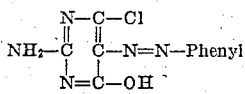

38 parts of aminoacetone hydrochloride are dissolved in 250 parts of ethyl alcohol and to the solution there is added a solution of 48 parts of semicarbazide hydrochloride in 100 parts of water. The mixture is permitted to stand for 2 hours and is then filtered and the solid residue is recrystallized from aqueous alcohol and consists of aminoacetone-semicarbazone hydrochloride, M. P. 212° C. This product as the free base may be represented by the following formula:

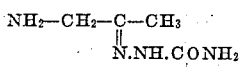

107 parts of aminoacetonesemicarbazone hydrochloride, made as described above, is added to a cold solution of 43.7 parts of sodium ethoxide in 600 parts of ethyl alcohol and the mixture is stirred for 2 hours. It is then added to a cold solution of 75 parts of 2-amino-4-hydroxy-5-benzeneazo-6-chloropyrimidine, made as described above, in 400 parts of dimethylformamide. It is allowed to stand for 12 hours and then filtered and the residual solid is washed successively with alcohol and water. There is obtained 2-amino-4-hydroxy-5-benzeneazo-6-acetonylaminopyrimidine semicarbazone, M. P. 206° C. having the formula:

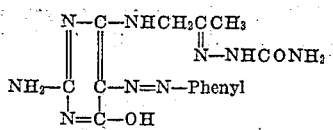

81 parts of 2-amino-4-hydroxy-5-benzeneazo-6-acetonylaminopyrimidinesemicarbazone is dissolved in 250 parts of glacial acetic acid and to the solution there are added 1500 parts of 2 N hydrochloric acid. The mixture is allowed to stand for 30 minutes and is then filtered and the residual solid is crystallised from ethyl alcohol. There is obtained 2-amino-4-hydroxy-5-benzeneazo-6-acetonylaminopyrimidine hydrochloride of M. P. higher than 300° C. The free base liberated from this salt has M. P. 183° C. and may be represented by the formula:

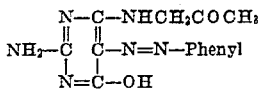

51 parts of 2-amino-4-hydroxy-5-benzeneazo-6-acetonylaminopyrimidine hydrochloride are dissolved in 250 parts of glacial acetic acid and the solution is stirred and heated to 80–90° C. and 40 parts of zinc dust are added to it during 30 minutes. The mixture is then filtered and 500 parts of 5 N hydrochloric acid are added to the filtrate which is then again filtered and the solid residue consists of 2-amino-4-hydroxy-8-methyl-9:10-dihydropteridin hydrochloride monohydrate, M. P. not below 300° C. Structurally, this product may be shown as follows:

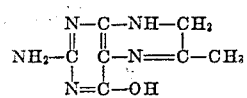

16.3 parts of 2-amino-4-hydroxy-8-methyl-9:10-dihydropteridin hydrochloride monohydrate are dissolved in 1200 parts of 0.25 N aqueous sodium hydroxide solution. To the stirred solution there are added 243 parts of 0.2 N aqueous potassium permanganate solution during one hour. The mixture is then filtered and carbon dioxide is passed into the filtrate which is then again filtered. The solid residue consists of 2-amino-4-hydroxy-8-methylpteridin, M. P. not below 300° C. and may be represented by the formula:

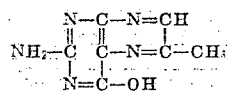

Example 2

1.2 parts of glycine ethyl ester hydrochloride are added to a solution of 0.53 part of sodium ethoxide in 5 parts of ethyl alcohol the mixture being stirred for 30 minutes. It is then added to a solution of 1 part of 2-amino-4-hydroxy-5-benzeneazo-6-chloropyrimidine, made as described in Example 1, in 5 parts of dimethylformamide and the mixture is allowed to stand for 12 hours and is then filtered. The solid residue is washed successively with ethyl alcohol and water and consists of 2-amino-4-hydroxy-5-benzeneazo-6-carboethoxymethylaminopyrimidine which, when crystallised from n-butanol, has M. P. 238° C. Structurally the product may be shown as follows:

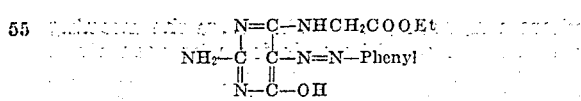

1 part of 2-amino-4-hydroxy-5-benzeneazo-6-carboethoxymethylaminopyrimidine, made as described above, is dissolved in 5 parts of glacial acetic acid and the solution is stirred and heated to 80–90° C. and then an excess of zinc dust is added slowly. The fine suspension of white solid is decanted from unused zinc dust and is then centrifuged. The so-separated solid is dissolved in boiling 0.25 N sulphuric acid and from the solution, when cold, there are filtered off colourless crystals of 9:10-dihydroxanthropterin sulphate, M. P. not below 300° C. having the formula:

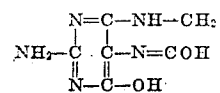

Example 3

In the process of Example 2 the glycine ethyl ester hydrochloride and the sodium ethoxide are replaced by equivalent quantities of glycine isopropyl ester hydrochloride and sodium isopropoxide respectively, and there is thus obtained isopropyl 2-amino-4-hydroxy-5-benzeneazo-6-pyrimidylamino acetate of M. P. 222° C. This product may be shown structurally as follows:

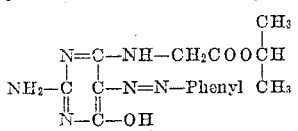

Example 4

The glycine ethyl ester hydrochloride in the process of Example 2 is replaced by an equivalent quantity of alanine ethyl ester hydrochloride and there is obtained ethyl α-(2-amino-4-hydroxy-5-benzeneazo-6-pyrimidylamino)propionate of M. P. 214° C. This product may be structurally shown as follows:

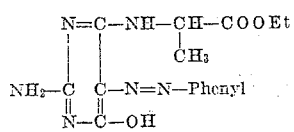

Example 5

To 144 parts of 2:4-diamino-6-chloropyrimidine dissolved in 1000 parts of cold water there is added a solution of p-chlorobenzene-diazonium chloride prepared from 130 parts of p-chloroaniline. Sufficient sodium acetate is added to the mixture to bring the pH to 5.0 and it is stirred for 24 hours. The yellow precipitate of 2:4-diamino-6-chloro-5-p-chlorobenzeneazopyrimidine of M. P. 270° C. is filtered off and dried. It may be structurally shown as follows:

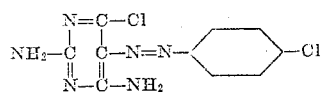

97 parts of glycine ethyl ester hydrochloride are added to a solution of 47 parts of sodium ethoxide in 260 parts of ethyl alcohol and the mixture is stirred for 15 minutes. It is then added to a solution of 49 parts of 2:4-diamino-6-chloro-5-p-chlorobenzeneazopyrimidine in 800 parts of dimethylformamide and the mixture is stirred at 60–70° C. for 12 hours. It is then filtered and the filtrate is concentrated to 200 parts by distillation under reduced pressure. There is then added an equal quantity of water and 2:4-diamino-5-p-chlorobenzeneazo-6-carboethoxymethylaminopyrimidine of M. P. 202° C. is filtered off and dried. This product may be represented by the formula:

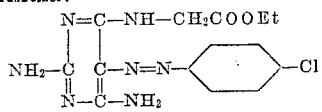

8 parts of 2:4-diamino-5-p-chlorobenzeneazo-6-carbethoxymethylaminopyrimidine made as described above, are dissolved in 20 parts of glacial acetic acid and the solution is heated to 80° C. 13 parts of zinc dust are then added with stirring and the mixture is boiled until the zinc is dissolved. It is then filtered hot and the filtrate is cooled and 2:6-diamino-3-hydroxy-9:10-dihydropterin acetate is filtered off, dissolved in 200 parts of warm water. The solution is mixed with 50 parts of 2 N sulphuric acid and filtered. 2:6-diamino-8-hydroxy-9:10-dihydropteridin sulphate is obtained, of M. P. above 300° C. The product may be structurally shown as follows:

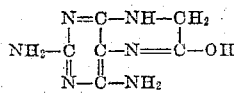

Example 6

225 parts of glycidylphenyl ether and 199 parts phthalimide are heated together at 160° C. for 2 hours. The mixture is then cooled and crystallised from ethyl alcohol to give 318 parts of 1-phthalimido-3-phenoxy-2-propanol of M. P. 117° C., having the following structural formula:

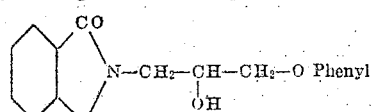

116 parts of 1-phthalimido-3-phenoxy-2-propanol are dissolved in 400 parts of glacial acetic acid and the solution is heated at 50° C. A solution of 47 parts of chromic anhydride in 80 parts of glacial acetic acid is then added with stirring, the temperature being maintained below 50° C. The mixture is then cooled and filtered and there is obtained 1-phthalimido-3-phenoxypropanone-2 of M. P. 165° C. and the following structural formula:

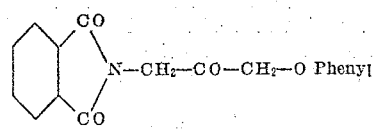

4.4 parts of 1-phthalimido-3-phenoxypropane-2 is dissolved in 100 parts of glacial acetic acid and the solution is mixed at 60° C. with a solution of 1.7 parts of semicarbazide hydrochloride and 2.5 parts of crystalline sodium acetate in 10 parts of water. The semicarbazone of 1-phthalimido-3-phenoxypropanone-2 is filtered off and crystallised from n-butanol; it has M. P. 193° C. and may be structurally shown as follows:

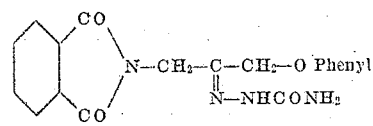

9.8 parts of the semicarbazone of 1-phthalimido-3-phenoxypropanone-2 is suspended in 45 parts of ethyl alcohol and a solution of 1.3 parts of sodium hydroxide in 20 parts of water. At the end of 1 hour the almost clear solution is filtered and the alcohol is distilled from the filtrate under reduced pressure. 4.7 parts of concentrated hydrochloric acid are then added below 50° C.; the mixture is filtered and the solid is suspended in 25 parts of ethyl alcohol and heated to 90° C. for 30 minutes with 12 parts of 0.33 N hydrochloric acid. The resulting solution is evaporated to a syrup under reduced pressure. It is then treated with 50 parts of water, filtered and the filtrate is evaporated to dryness. The residue is crystallised from ethyl alcohol to give the hydrochloride of the semicarbazone of 1-amino-3-phenoxypropanone-2 of M. P. 201° C. The free base of this compound may be shown as follows:

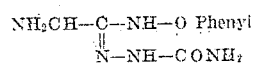

22.5 parts of the hydrochloride of the semicarbazone of 1-amino-3-phenoxypropanone-2 are added to a sold solution of 5.9 parts of sodium ethoxide in 90 parts of ethyl alcohol, to which have been added 7.5 parts of sodium bicarbonate and a solution of 14.5 parts of 2 - amino - 4-hydroxy-5-benzeneazo-6-chloropyrimidine in 100 parts of dimethylformamide. The mixture is stirred for 24 hours, filtered and the solid washed with ethyl acetate and water; it consists of the semicarbazone of 1-phenoxy-3(2'-amino-4'-hydroxy-5'-benzeneazo-6'-pyrimidylamino)acetone which melts at 265° C. with decomposition. 16.5 parts of this semicarbazone are dissolved in 65 parts of glacial acetic acid and to this solution are added 78 parts of 5 N hydrochloric acid. The mixture is allowed to stand and after one hour is filtered. 1-phenoxy-3-(2'-amino-4'-hydroxy-5'-benzeneazo - 6' - pyrimidylamino)acetone hydrochloride of M. P. 192° C. with decomposition is filtered off and dried. It has the following structural formula:

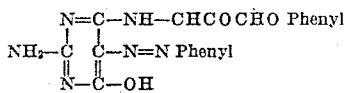

Example 7

30 parts of 4-chloro-2:6-dimethoxypyrimidine and 180 parts of 20% hydrochloric acid are heated together at to 80° C. for 30 minutes; 200 parts of water are then added and the solid which separates is filtered off. This is washed with light petroleum and the residual 4-chloro-2:6-dihydroxypyrimidine is crystallised from water. It has M. P. 30° C. and the following structural formula:

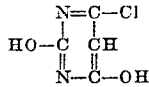

29.5 parts of 4-chloro-2:6-dihydroxypyrimidine are dissolved in 2000 parts of hot water and the solution is cooled rapidly to 0° C., 34 parts of sodium bicarbonate are then added followed by a solution of p-toluenediazonium chloride prepared from 21.5 parts of p-toluidine. The mixture is stirred for 84 hours and then filtered. The solid is ground with an excess of dilute hydrochloric acid, filtered, washed with water and dried. It consists of 4-chloro-2:6-dihydroxy-5-p-tolueneazopyrimidine of M. P. 240° C. with decomposition and may be structurally shown as follows:

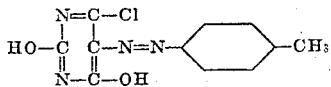

To a cold solution of sodium methoxide prepared by dissolving 3.7 parts of sodium in 75 parts of methyl alcohol there are added 20 parts of glycine methyl ester hydrochloride followed by 19.4 parts of 4-chloro-2:6-dihydroxy-5-p-tolueneazopyrimidine in 1000 parts of dimethyl formamide. The mixture is stirred for 17 hours and filtered. The solid residue is washed, first with water and then with methyl alcohol to give methyl 4-2:6-dihydroxy - 5 - p - tolueneazo-4-pyrimidylaminoacetate of M. P. 272° C. with decomposition. It has the following structural formula:

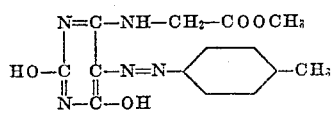

1.6 parts of methyl 4-chloro-2:6-dihydroxy-5-p-tolueneazopyrimidylaminoacetate is suspended in 25 parts of water, containing 5 parts of 2 N sodium hydroxide. 3 parts of sodium hydrosulphite is then added slowly at 50° C. The mixture is then boiled, acidified and filtered. The residue consists of 2:6:8-trihydroxy-9:10-dihydropteridin which does not melt below 300° C. This product may be structurally shown as follows:

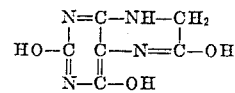

Example 8

29 parts of 4-chlorocytosine are finely ground and suspended in 3000 parts of water and the suspension is mixed with 34 parts of sodium bicarbonate and a solution of p-toluenediazonium chloride prepared from 21.5 parts of p-toluidine is added. The mixture is stirred for 17 hours and filtered. The solid residue consists of 6-amino - 4 - chloro-2-hydroxy-5-p-tolueneazopyrimidine, having the following structural formula:

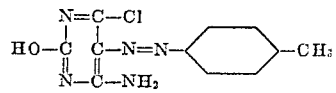

This substance is then condensed with glycine methyl ester by the process described in Example 7, to give methyl 4-amino-2-hydroxy-5-p-tolueneazo-6-pyrimidylaminoacetate of M. P. 200° C., with decomposition. Structurally, this product may be shown as follows:

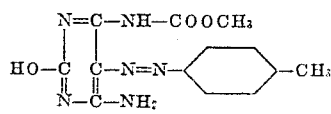

Example 9

42 parts of glycine ethyl ester hydrochloride are dissolved in a cold solution of sodium ethoxide prepared from 6.9 parts of sodium and 450 parts of ethyl alcohol and to this solution there are added 24 parts of 2-amino-4:6-dichloropyrimidine. The mixture is boiled under reflux for 12 hours. It is then cooled and filtered and the filtrate is evaporated to dryness. The residue is triturated with water and filtered. There is obtained ethyl 2-amino-4-chloro-6-pyrimidylaminoacetate which is crystallized from toluene and has M. P. 151° C. 46 parts of ethyl 2-amino - 4 - chloro-6-pyrimidylaminoacetate are dissolved in 1000 parts of glacial acetic acid and mixed with a solution of p-chlorobenzenediazonium chloride prepared from 25.5 parts of p-chloroaniline together with 60 parts of crystallised sodium acetate. The mixture is stirred for 3 days and ethyl 2-amino-4-chloro-5-chlorobenzeneazo-6-pyrimidylaminoacetate of M. P. 210° C. is filtered off. It may structurally be shown as follows:

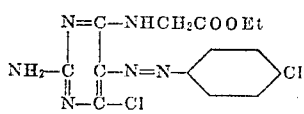

2 parts of this substance are suspended in 90 parts of ethyl alcohol and 30 parts of 2 N sodium hydrosulphide are added and the mixture is boiled under reflux for 3 hours and then filtered hot. The filtrate is cooled and acidified with acetic acid and filtered. The residue consists of ethyl 2-amino-4-mercapto-5-p-chlorobenzene-azo-6-pyrimidylaminoacetate. It may be reduced with zinc and acetic acid by the process described in Example 1 and there is obtained 2-amino-6-mercapto-8-hydroxy-9:10-dihydropteridin which does not melt below 350° C. This product may be shown as follows:

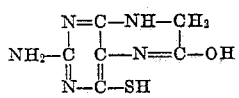

Example 10

18.5 parts of ethyl 2-amino-4-chloro-5-p-chlorobenzeneazo - 6-pyrimidylaminoacetate, 15 parts of diethylamine and 450 parts of ethyl acetate are heated together under reflux for 5 hours. The ethylacetate is then distilled off and the residue is triturated with water and filtered. There is obtained ethyl 2-amino-4-diethylamino-5 - p-chlorobenzeneazo -6-pyrimidylaminoacetate which is crystallized from light petroleum and has M. P. 139° C. This substance may be reduced by means of zinc and acetic acid and is thus converted to 2-amino-6-diethylamino-8-hydroxy-9:10-dihydropteridin of M. P. 228° C. with decomposition. It has the following structural formula:

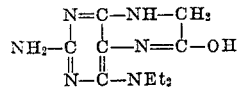

Example 11

18.5 parts of ethyl 2-amino-4-chloro-5-benzeneazo-6-pyrimidylaminoacetate, 40 parts of methyl alcohol and 70 parts of 23% aqueous methylamine solution are mixed together and boiled under reflux for 1 hour. The mixture is then evaporated to dryness and the residue triturated with water and filtered. There is obtained 2 - amino - 4-methylamino-5-benzeneazo-6-pyrimidylaminoacetmethylamide of M. P. 241° C. If the process of this example be carried out in ethyl acetate solution instead of in methyl alcohol solution the product is ethyl 2-amino - 4 - methylamino-5-benzeneazo-6-pyrimidylaminoacetate. Both of these substances may be reduced with zinc and acetic acid to give 2-amino - 6 - methylamino - 8 -hydroxy-9:10-dihydropteridin which does not melt below 360° C. It has the following structural formula:

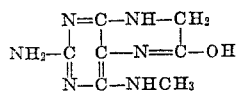

What we claim is:
1. Pyrimidine derivatives of the general formula:

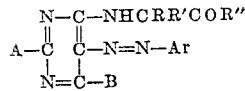

wherein A stands for a radical from the group consisting of hydroxyl, amino, alkylamino and thio radicals, B stands for a radical from the group consisting of hydroxyl, alkoxy, thiol, alkylthio, amino, and amino in which at least one of the amino hydrogen atoms is replaced by a hydrocarbon radical, Ar is a monocyclic carbocyclic aryl radical, R and R' are radicals selected from the group consisting of hydrogen, hydrocarbon, and —COR'' radicals, only one of R and R' being —COR'' at any time, and R'' is a radical selected from the group consisting of hydrogen, hydrocarbon, hydrocarbon-oxy, amino, and amino in which one of the amino hydrogen atoms is replaced by a hydrocarbon radical.

2. Process for the manufacture of pyrimidine derivatives claimed in claim 1, which comprises reacting a pyrimidine derivative of the formula:

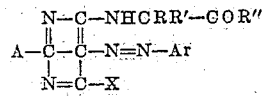

wherein A, Ar, R, R' and R'' have the meaning stated in claim 1 and wherein X stands for a chlorine atom with a reagent adapted to the replacement of an active halogen substituent selected from the group consisting of alkali metal hydroxides; alkali metal alkoxides; hydrogen sulfide and alkali metal hydrosulfides; alkali metal mercaptides; ammonia and primary and secondary amines.

3. Pyrimidine derivatives of the general formula:

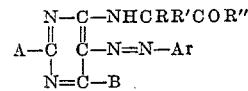

wherein A is amino, B is hydroxyl, R and R' are hydrogen, R'' is alkyl and Ar is phenyl.

4. Process for the manufacture of pyrimidine derivatives of the formula

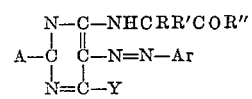

wherein A, Ar, R, R' and R'' have the meaning stated in claim 1 and wherein Y stands for a substituent selected from the group consisting of hydroxyl, thiol, amino and alkylamino, which comprises reacting a pyrimidine derivative of the formula:

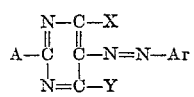

wherein A, Ar and Y have the meaning stated above and wherein X stands for a chlorine substituent, with a member of the group consisting of α-amino-aldehydes, -ketones and -carboxylic acid esters and amides of the formula:

wherein R, R' and R'' have the meaning stated above.

5. Process as claimed in claim 4, wherein in the substance of formula:

R'' is selected from the group consisting of hydrogen and hydrocarbon, and wherein the said substance is brought into reaction in the form of an acetal, the product being then subsequently liberated from its functional derivative by hydrolysis.

6. Process as claimed in claim 4, wherein in the substance of formula:

R'' is selected from the group consisting of hydrogen and hydrocarbon, and wherein the said substance is brought into reaction in the form of an oxime, the product being then subsequently liberated from its functional derivative by hydrolysis.

7. Process as claimed in claim 4, wherein in the substance of formula:

$$NH_2-CRR' \ COR''$$

$R''$ is selected from the group consisting of hydrogen and hydrocarbon, and wherein the said substance is brought into reaction in the form of a semi-carbazone, the product being then subsequently liberated from its functional derivative by hydrolysis.

WILLIAM ROBERT BOON.
THOMAS LEIGH.

REFERENCES CITED

The following references are of record in the file of this patent:

UNITED STATES PATENTS

| Number | Name | Date |
|---|---|---|
| 2,059,852 | Dahlen | Nov. 3, 1936 |
| 2,512,572 | Smith | June 20, 1950 |

OTHER REFERENCES

Lythgoe et al.: Journal of Chemical Society, London, pages 315–317.

Baddiley et al.: ibidum, pages 318–320.